(12) United States Patent
Omran et al.

(10) Patent No.: US 12,350,655 B1
(45) Date of Patent: Jul. 8, 2025

(54) $C_3N_4$@$MoO_3$/$MgAl_2O_4$ NANOCOMPOSITE AND METHOD OF PREPARATION THEREOF

(71) Applicant: IMAM MOHAMMAD IBN SAUD ISLAMIC UNIVERSITY, Riyadh (SA)

(72) Inventors: Mohamed Khairy Abdel Fattah Omran, Riyadh (SA); Babiker Yagoub Elhadi Abdulkhair, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/059,901

(22) Filed: Feb. 21, 2025

(51) Int. Cl.
*B01J 27/24* (2006.01)
*B01J 23/00* (2006.01)
(Continued)

(52) U.S. Cl.
CPC ............. *B01J 27/24* (2013.01); *B01J 23/005* (2013.01); *B01J 23/02* (2013.01); *B01J 23/28* (2013.01); *B01J 35/45* (2024.01); *B01J 35/612* (2024.01); *B01J 35/613* (2024.01); *B01J 35/633* (2024.01); *B01J 35/635* (2024.01); *B01J 35/647* (2024.01);
(Continued)

(58) Field of Classification Search
CPC . B01J 27/24; B01J 35/45; B01J 35/647; B01J 35/613; B01J 35/633; B01J 35/635; B01J 35/612; B01J 23/005; B01J 23/02; B01J 23/28; B01J 37/0036; B01J 37/04; B01J 37/084; B01J 37/088; H01G 11/36;
(Continued)

(56) References Cited

FOREIGN PATENT DOCUMENTS

| CN | 113451056 A | 9/2021 |
|---|---|---|
| CN | 115974242 A | 4/2023 |

(Continued)

OTHER PUBLICATIONS

Milad Zehtab Salmasi et al., "Spinel MgAl2O4 nanospheres couples with modified graphitic carbon nitride nanosheets as an efficient Z-scheme photocatalyst for photodegradation of organic contaminants." Applied Surface Science 585, pp. 1-16. (Year: 2022).*

(Continued)

*Primary Examiner* — Patricia L. Hailey
(74) *Attorney, Agent, or Firm* — Oblon, McClelland, Maier & Neustadt, L.L.P.

(57) ABSTRACT

A method of manufacturing a nanocomposite is described. The method includes combining a magnesium salt, an aluminum salt, and a molybdate salt in stoichiometric proportions within 5 mole percent (mol. %) in an aqueous solvent including a carbon source, to obtain a first mixture. The method further includes heating the first mixture to remove at least 99.5 percent by weight (wt. %) of the aqueous solvent to obtain a first solid, grinding the first solid into a first powder, calcining the first powder at a temperature of about 600° C. to 800° C. for a time of about 2 to 4 hours (h) to obtain a second solid, grinding the second solid and urea, into a second powder, heating the second powder at a temperature of about 550° C. to 650° C. for a time of about 15 minutes (min) to 1.5 h to obtain the nanocomposite.

20 Claims, 6 Drawing Sheets

(51) Int. Cl.
*B01J 23/02* (2006.01)
*B01J 23/28* (2006.01)
*B01J 35/45* (2024.01)
*B01J 35/61* (2024.01)
*B01J 35/63* (2024.01)
*B01J 35/64* (2024.01)
*B01J 37/00* (2006.01)
*B01J 37/04* (2006.01)
*B01J 37/08* (2006.01)
*H01G 11/36* (2013.01)

(52) U.S. Cl.
CPC ........... *B01J 37/0036* (2013.01); *B01J 37/04* (2013.01); *B01J 37/084* (2013.01); *B01J 37/088* (2013.01); *H01G 11/36* (2013.01)

(58) Field of Classification Search
CPC .............. C01P 2002/32; C01P 2002/76; C01P 2002/78; C01P 2002/01
USPC ........................ 502/174, 200, 524, 306, 321
See application file for complete search history.

(56) References Cited

FOREIGN PATENT DOCUMENTS

| | | |
|---|---|---|
| CN | 118022811 A | 5/2024 |
| IN | 202331026007 | 10/2024 |

OTHER PUBLICATIONS

Yuanzhi Li et al., "MoO3/g-C3N4 heterostructure for degradation of organic pollutants under visible light irradiation: High effieciency, general degradation and Z-scheme degradation mechanism." Ceramics International 47, pp. 33697-33708. (Year: 2021).*

S. Senthilnathan, et al., "MoS2 modified g-C3N4 composite: A potential candidate for photocatalytic applications", Journal of Saudi Chemical Society. vol. 27, Issus 5, Sep. 2023 (10 pages).

\* cited by examiner

$C_3N_4@MoO_3/MgAl_2O_4$ NANOCOMPOSITE AND METHOD OF PREPARATION THEREOF

BACKGROUND

Technical Field

The present disclosure is directed towards a method of manufacturing a nanocomposite, and more particularly, a method of manufacturing a nanocomposite of graphitic carbon nitride (g-$C_3N_4$), molybdenum oxide ($MoO_3$), and magnesium aluminate ($MgAl_2O_4$) ($C_3N_4@MoO_3/MgAl_2O_4$) using dextrose.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Energy storage devices, such as supercapacitors, require materials with high specific surface area, excellent electrical conductivity, and chemical stability to achieve optimal performance. Carbon nanomaterials have emerged as a promising class of materials for such applications due to the desirable properties and versatility of carbon nanomaterials. The aforementioned nanomaterials possess a highly specific surface area, which facilitates increased contact with electrolytes, thereby enhancing the active area essential for efficient charge storage and discharge processes. Furthermore, carbon nanomaterials exhibit excellent electrical conductivity, which is crucial for improving charge transfer efficiency and overall device performance.

Carbon nanomaterials are chemically stable and can be easily loaded with electrochemically active species to further enhance energy storage capabilities. The cost-effectiveness and environmentally friendly nature of carbon nanomaterials render them a preferred choice for various energy storage applications. Moreover, the integration of carbon nanomaterials into composite structures or their combination with other materials, such as metal films or graphene, has been shown to significantly improve the energy density and rate performance of supercapacitors.

Among carbon-based materials, graphitic carbon nitride (g-$C_3N_4$) presents several advantages over traditional activated carbon for supercapacitor applications. In particular, g-$C_3N_4$ is an active photocatalyst under visible light, in contrast to activated carbon, which lacks photocatalytic activity. The aforementioned property permits g-$C_3N_4$ to harness solar energy for charge storage, offering a renewable and sustainable energy solution. Additionally, g-$C_3N_4$ has a narrower bandgap compared to activated carbon, allowing g-$C_3N_4$ to absorb a broader spectrum of light wavelengths, which may enhance energy conversion efficiency and contribute to improved supercapacitor performance. Furthermore, g-$C_3N_4$ may be readily modified and tailored through techniques such as carbon-defect engineering and two-dimensional structural engineering. The modifications may enhance the structural properties of g-$C_3N_4$, such as increasing surface area and porosity, which are critical factors for effective charge storage in supercapacitors. As a result, g-$C_3N_4$ exhibits superior photoactivity, broader light absorption capabilities, and improved structural properties compared to activated carbon, making it a highly promising material for next-generation supercapacitor applications. However, present techniques of manufacturing g-$C_3N_4$ are not efficient and economically sophisticated. Hence, there arises a requirement for a better and more efficient method of manufacturing carbon nanomaterials, including those containing metal oxide composites.

Research in this field has been conducted, e.g., by Ibrahim, et al., entitled "Eliminating Manifold Pharmaceutical Pollutants with Carbon Nanoparticles Driven via a Short-Duration Ball-Milling Process," from *Surfaces* 2024, 7 (3), 493-507, and Khairy, et al., entitled "Enhancing the Conductivity and Dielectric Characteristics of Bismuth Oxyiodide via Activated Carbon Doping," in *Molecules* 2024, 29 (9), 2082, each of which is incorporated by reference herein. Such work has not satisfied all requirements of the market nor the issues addressed by the present application.

Accordingly, one object of the present disclosure is to provide a method of manufacturing carbon hybrid nanomaterials, that may circumvent the drawbacks, such as, low yield, high cost, low efficiency, of the methods known in the art.

SUMMARY

In an exemplary embodiment, a method of manufacturing a nanocomposite is described. The method includes combining a magnesium salt, an aluminum salt, and a molybdate salt in stoichiometric proportions within 5 mole percent (mol. %) in an aqueous solvent, including a carbon source, to obtain a first mixture. The method further includes heating the first mixture to remove at least 99.5 percent by weight (wt. %) of the aqueous solvent to obtain a first solid, grinding the first solid into a first powder, calcining the first powder at a temperature in a range of from 600 degrees Celsius (° C.) to 800° C. for a time in a range of 2 to 4 hours (h) to obtain a second solid. The method further includes grinding the second solid and urea, in an amount sufficient to form the nanocomposite, into a second powder, heating the second powder at a temperature in a range of from 550° C. to 650° C. for a time in a range of 15 minutes (min) to 1.5 h to obtain the nanocomposite, including graphitic graphitic carbon nitride (g-$C_3N_4$), molybdenum oxide ($MoO_3$), and magnesium aluminate ($MgAl_2O_4$) in a mass relationship to each other in a range of 5 to 15:2 to 7:75 to 95.

The average pore distribution of the nanocomposite may be unimodal, and a Brunauer-Emmett-Teller (BET) specific surface area of the nanocomposite may be in a range of from 8 square meters per gram ($m^2$/g) to 12 $m^2$/g (e.g., ~10.1 $m^2$/g), and/or an average pore diameter of the nanocomposite, according to Barrett-Joyner-Halenda (BJH) measurement method, may be in a range of 5 to 15 nanometers (nm) (e.g., ~8.34 nm), and/or an average pore volume of the nanocomposite, according to the BJH measurement method, may be in a range of from 0.01 cubic centimeters per gram ($cm^3$/g) to 0.05 $cm^3$/g (e.g., ~0.033 $cm^3$/g).

The nanocomposite may have a (311) spinel interplanar spacing in a range of 0.205 nm to 0.285 nm, (411) $MoO_3$ interplanar spacing in a range of 0.150 nm to 0.230 nm, (511) spinel interplanar spacing in a range of 0.115 nm to 0.195 nm, (311) magnesium dioxide (MgO) interplanar spacing in a range of 0.087 nm to 0.167 nm, and/or (622) spinel interplanar spacing in a range of 0.080 nm to 0.160 nm, according to selected area diffraction (SAED).

The mass relationship of the nanocomposite may be in a range of from 9 to 11:4 to 6:84 to 86, where the nanocomposite has a (311) spinel interplanar spacing of 0.245±2% nm, (411) MoO₃ interplanar spacing of 0.19±2% nm, (511) spinel interplanar spacing of 0.155±2% nm, (311) MgO interplanar spacing of 0.127±2% nm, and/or (622) spinel interplanar spacing of 0.12±2% nm, according to SAED. Further, an X-ray diffraction (XRD) spectrum of the nanocomposite under Cu-filtered Cu-Kα radiation (1.5418 angstroms (Å)) powered at 45 kilovolts (kV) and 10 milliamperes (mA) has 2θ peaks of an MoO₃ hexagonal phase at 18.7±1°, 28.7±1°, 33.0±1°, 33.8±1°, 36.8±1°, and 42.8±1°, an MgAl₂O₄ spinel phase at 19.3±1°, 36.8±1°, 44.6±1°, 59.3±1°, and 65.01±1°, an MgO cubic phase at 42.8±1°, 62.2±1°, and 74.6±1°, and/or g-C₃N₄-related diffractions at 27.8±1°, 36.8±1°, 44.6±1°, and 59.3±1°. No more than 1% relative intensity Al₂O₃ may be detected in the XRD spectrum.

The magnesium salt in the combining may include Mg(NO₃)₂, the aluminum salt in the combining includes aluminium nitrate (Al(NO₃)₃), the molybdate salt in the combining may include ammonium molybdate ((NH₄)₂MoO₄). The heating of the first mixture may obtain the first solid with at least 99.9 wt. % of the aqueous solvent removed, the calcining may be at a temperature in a range of from 675° C. to 725° C. for a time in a range of from 2.75 to 3.25 h, and the heating of the second powder is at a temperature in a range of from 590° C. to 610° C. for a time in a range of from 55 min to 1.1 h.

The nanocomposite obtained may include no molybdenum sulfide (MoS₂), or may exclude added MoS₂, such as no detectable amounts thereof by, e.g., combustion analysis and/or spectroscopic analysis (e.g., UV-vis, fluorescence, XPS, IR, ESR, etc.). The nanocomposite obtained may include no sulfide, exclude added sulfide or metal sulfide, such as no detectable amounts thereof by, e.g., combustion analysis and/or spectroscopic analysis (e.g., UV-vis, fluorescence, XPS, IR, ESR, etc.).

The nanocomposite obtained may include less than 10 wt. % Co, relative to total nanocomposite weight.

In some embodiments, the nanocomposite obtained includes less than 1 wt. % Co, relative to total nanocomposite weight.

The nanocomposite obtained may include no added Co, such as only inevitable traces.

The first powder in the calcining may include no melamine or exclude added melanine.

The average pore distribution of the nanocomposite may be unimodal.

A BET specific surface area of the nanocomposite may be in a range of from 8 m²/g to 12 m²/g.

An average pore diameter of the nanocomposite, according to BJH measurement method, may be in a range of from 5 nm to 15 nm.

An average pore volume of the nanocomposite, according to the BJH measurement method, may be in a range of from 0.01 cm³/g to 0.5 cm³/g.

The MoO₃ in the nanocomposite may have a hexagonal crystal structure.

The heating of the first mixture may remove the aqueous solvent such that the first solid is a solid that can be ground to a powder without further solvent removal.

The carbon source includes menthol and/or dextrose.

The nanocomposite may include graphitic C₃N₄, MoO₃, and MgAl₂O₄. The graphitic C₃N₄, MoO₃, and MgAl₂O₄ may be present in the nanocomposite in a mass relationship to each other in a range of from 5 to 15:2 to 7:75 to 95.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

As used herein, the term 'room temperature' refers to a temperature range of '25 degrees Celsius (° C.)±3° C. in the present disclosure.

As used herein, the term 'nanoparticles (NPs)' refers to particles having a particle size of 1 nanometer (nm) to 500 nm within the scope of the present invention.

As used herein, the term 'nanocomposite' refers to a composite material that has at least one component with a grain size measured in nanometers.

As used herein, the term 'nanohybrid composite' refers to a material that combines nanomaterials (such as nanoparticles, nanotubes, or nanofibers) with another material, typically a polymer, metal, or ceramic, to form a composite structure. The nanomaterials are typically incorporated at the nanoscale level to enhance the properties of the base material, such as improving strength, conductivity, or flexibility, while maintaining the advantages of both components. The resulting nanohybrid composite exhibits unique properties that are superior to the individual materials alone.

As used herein, the term 'porosity' refers to a measure of the void or vacant spaces within a material.

As used herein, the term 'pore diameter' refers to an average width or size of the pores (void spaces) within a material, typically measured in nm or angstroms (Å). It is a key parameter in characterizing the texture and permeability of porous materials, influencing their adsorption, filtration, or catalytic properties. The pore diameter is often determined using methods such as nitrogen adsorption or mercury intrusion, which provide insights into the material's ability to absorb or interact with molecules of specific sizes.

As used herein, the term 'pore volume' refers to the total volume of void spaces (pores) within a material that is capable of being filled by a gas or liquid. It is typically expressed in cubic centimeters per gram ($cm^3/g$) and is an important parameter in characterizing the porous structure of materials, such as adsorbents or catalysts.

As used herein, the term 'photodegradation' refers to the process by which a material undergoes chemical breakdown or alteration due to exposure to light. This process typically results in the breaking of molecular bonds within the material, leading to the formation of new compounds or the degradation of its physical and chemical properties.

As used herein, the term 'contaminants' refer to the harmful substances or contaminants that degrade the quality of water, air, soil, or food, making them unsafe or unsuitable for specific uses. In water, contaminants include biological agents like bacteria, viruses, and parasites; chemical substances such as heavy metals, pesticides, pharmaceuticals, and industrial chemicals; and physical materials like dirt, debris, and sediment. These contaminants can pose serious risks to human health, the environment, and ecosystems, depending on their type, concentration, and exposure levels.

As used herein, the term 'organic contaminants' refers to carbon-based compounds, typically derived from industrial, agricultural, or domestic activities, that are present as contaminants in water or the environment. These contaminants may include pesticides, pharmaceuticals, dyes, and other synthetic or natural organic substances that can pose environmental or health risks.

The organic contaminant may be a dye, a phenol, a polycyclic aromatic hydrocarbon, an herbicide, a pesticide, a persistent organic contaminant, or the like.

The organic contaminant may be a dye, i.e., a colored substance that chemically binds to a material it may be intended to color. Generally, a dye is applied in solution, typically aqueous solution. Examples of dyes include, but are not limited to: acridine dyes, which are acridine and its derivatives such as acridine orange, acridine yellow, acriflavine, and gelgreen; anthraquinone dyes, which are anthroaquinone and its derivatives such as acid blue 25, alizarin, anthrapurpurin, carminic acid, 1,4-diamno-2,3-dihydroanthraquinone, 7,14-dibenzypyrenequinone, dibromoanthrone, 1,3-dihydroxyanthraquinone, 1,4-dihydroxyanthraquinone, disperse red 9, disperse red 11, indanthrone blue, morindone, oil blue 35, parietin, quinizarine green SS, remazol brilliant blue R, solvent violet 13, 1,2,4-trihydroxyanthraquinone, vat orange 1, and vat yellow 1; diaryl methane dyes such as auramine O, triarylmethane dyes such as acid fuchsin, aluminon, aniline blue WS, aurin, aurintricarboxylic acid, brilliant blue FCF, brilliant green, bromocresol green, bromocresol purple, bromocresol blue, bromophenol blue, bromopyrogallol red, chlorophenol red, coomassie brilliant blue, cresol red, O-cresolphthalein, crystal violet, dichlorofluorescein, ethyl green, fast green FCT, FIASH-EDT2, fluoran, fuchsine, green S, light green SF, malachite green, merbromin, metacresol purple, methyl blue, methyl violet, naphtholphthalein, new fuchsine, pararosaniline, patent blue V, phenol red, phenolphthalein, phthalein dye, pittacal, spirit blue, thymol blue, thymolphthalein, Victoria blue BO, Victoria blue R, water blue, xylene cyanol, and xylenol orange; azo dyes such as acid orange 5, acid red 13, alican yellow, alizarine yellow R, allura red AC, amaranth, amido black 10B, aniline yellow, arylide yellow, azo violet, azorubine, basic red 18, biebrich scarlet, Bismarck brown Y, black 7984, brilliant black BN, brown FK, chrysoine resorcinol, citrus red 2, congo red, D&C red 33, direct blue 1, disperse orange 1, eriochrome black T, evans blue, fast yellow AB, orange 1, hydroxynaphthol blue, janus green B, lithol rubine BK, metanil yellow, methyl orange, methyl red, methyl yellow, mordant brown 33, mordant red 19, naphthol AS, oil red O, oil yellow DE, orange B, orange G, orange GGN, para red, pigment yellow 10, ponceau 2R, prontosil, red 2G, scarlet GN, Sirius red, solvent red 26, solvent yellow 124, sudan black B, sudan I, sudan red 7B, sudan stain, tartrazine, tropaeolin, trypan blue, and yellow 2G; phthalocyanine dyes such as phthalocyanine blue BN, phthalocyanine Green G, Alcian blue, and naphthalocyanine, azin dyes such as basic black 2, mauveine, neutral red, Perkin's mauve, phenazine, and safranin; indophenol dyes such as indophenol and dichlorophenolindophenol; oxazin dyes; oxazone dyes; thiazine dyes such as azure A, methylene blue, methylene green, new methylene blue, and toluidine blue; thiazole dyes such as primuline, stains-all, and thioflavin; xanthene dyes such as 6-carboxyfluorescein, eosin B, eosin Y, erythosine, fluorescein, rhodamine B, rose bengal, and Texas red; fluorone dyes such as calcein, carboxyfluorescein diacetate succinimidyl ester, fluo-3, fluo-4, indian yellow, merbromin, pacific blue, phloxine, and seminaphtharhodafluor; or rhodamine dyes such as rhodamine, rhodamine 6G, rhodamine 123, rhodamine B, sulforhodamine 101, and sulforhodamine B.

A phenol is an organic compound consisting of a hydroxyl group (—OH) bonded directly to an aromatic hydrocarbon group. Examples of phenols include, but are not limited to, phenol (the namesake of the group of compounds), bisphenols (including bisphenol A), butylated hydroxytoluene (BHT), 4-nonylphenol, orthophenyl phenol, picric acid, phenolphthalein and its derivatives mentioned above, xylenol, diethylstilbestrol, L-DOPA, propofol, butylated hydroxyanisole, 4-tert-butylcatechol, tert-butylhydroquinone, carvacrol, chloroxyleol, cresol (including M-, O—, and P-cresol), 2,6-di-tert-butylphenol, 2,4-dimethyl-6-tert-butylphenol, 2-ethyl-4,5-dimethylphenol, 4-ethylguaiacol, 3-ethylphenol, 4-ethylphenol, flexirubin, mesitol, 1-nonyl-4-phenol, thymol, 2,4,6-tri-tert-butylphenol, chlorophenol (including 2-, 3-, and 4-chlorophenol), dichlorophenol (including 2,4- and 2,6-dichlorophenol), bromophenol, dibromophenol (including 2,4-dibromophenol), nitrophenol, norstictic acid, oxybenzone, and paracetamol (also known as acetaminophen).

A polycyclic aromatic hydrocarbon (PAH) is an aromatic hydrocarbon composed of multiple aromatic rings. Examples of polycyclic aromatic hydrocarbons include naphthalene, anthracene, phenanthrene, phenalene, tetracene, chrysene, triphenylene, pyrene, pentacene, benzo[a]pyrene, corannulene, benzo[g,h,i]perylene, coronene, ovalene, benzo[c]fluorine, acenaphthene, acenaphthylene, benz[a]anthracene, benzo[b]fluoranthene, benzo[j]fluoranthene, benzo[k]fluoranthene, benzo[e]pyrene, cyclopenta[c,d]pyrene, dibenz[a,h]anthracene, dibenzo[a,e]pyrene, dibenzo[a,h]pyrene, dibenzo[a,i]pyrene, dibenzo[a,l]pyrene, fluoranthene, fluorine, indeno[1,2,3-c,d]pyrene, 5-methylchrysene, naphthacene, pentaphene, picene, and biphenylene.

An herbicide (also known as "weedkiller") is a substance that is toxic to plants and may kill, inhibit the growth of, or prevent the germination of plants. Herbicides are typically used to control the growth of or remove unwanted plants from an area of land, particularly in an agricultural context. Examples of herbicides include, but are not limited to, 2,4-D, aminopyralid, chlorsulfuron, clopyralid, dicamba, diuron, glyphosate, hexazinone, imazapic, imazapyr, methsulfuron methyl, picloram, sulfometuron methyl, triclopyr, fenoxaprop, fluazifop, quizalofop, clethodim, sethoxydim, chlorimuron, foramsulfuron, halosulfuron, nicosulfuron, primisulfuron, prosulfuron, rimsulfuron, thofensulfuron, tribenuron, imazamox, imazaquin, flumetsulam, cloransulam, thiencarbazone, fluoxpyr, diflufenzopyr, atrazine, simazine, metribuzin, bromoxynil, bentazon, linuron, glufosinate, clomazone, isoxaflutole, topramezone, mesotrione, tembotrione, acifluorfen, formesafen, lactofen, flumiclorac, flumioxazin, fulfentrazone, carfentrazone, fluthiacet-ethyl, falufenacil, paraquat, ethalfluralin, pendimethalin, trifluralin, butylate, EPTC, ecetochlor, alachlor, metolachlor, dimethenamid, flufenacet, and pyroxasulfone.

A pesticide is a substance meant to prevent, destroy, or control pests including, but not limited to algae, bacteria, fungi, plants, insects, mites, snails, rodents, and viruses.

A pesticide intended for use against algae is known as an algicide. Examples of algicides include benzalkonium chloride, bethoxazin, cybutryne, dichlone, dichlorophen, diuron, endothal, fentin, isoproturon, methabenthiazuron, nabam, oxyfluorfen, pentachlorophenyl laurate, quinoclamine, quinonamid, simazine, terbutryn, and tiodonium.

A pesticide intended for use against bacteria is known as a bactericide. Examples of bactericides include antibiotics such as: aminoglycosides such as amikacin, gentamicin, kanamycin, neomycin, netilmicin, tobramycin, paromomycin, streptomycin, and spectinomycin; ansamycins such as geldanamycin, herbimycin, and rifaximin; carbacephems such as loracarbef; carbapenems such as ertapenem, doripenem, imipenem, and meropenem; cephalosporins such as cefadroxil, cefazolin, cephradine, cephapirin, cephalothin, cephalexin, cefaclor, cefoxitin, cefotetan, cefamandole, cefmetazole, cefonicid, cefprozil, cefuroxime, cefixime, cefdinir, cefditoren, cefoperazone, cefotaxime, cefpodoxime, cefazidime, ceftibuten, ceftizoxime, moxalactam, ceftriaxone, cefepime, cefaroline fosamil, and ceftobiprole; glycopeptides such as teicoplanin, vancomycin, telavancin, dalbavancin, and oritavancin; lincosamides such as clindamycin and lincomycin; lipopeptides such as daptomycin; macrolides such as azithromycin, clarithromycin, erythromycin, roxithromycin, telithromycin, spiramycin, and fidoxamicin; monobactams such as aztreonam; nitrofurans such as furazolidone and nitrofurantoin; oxazolidinones such as linezolid, posizolid, radezolid, and torezolid; penicillins such as amoxicillin, ampicillin, azlocillin, dicloxacillin, flucloxacillin, mezlocillin, methicillin, nafcillin, oxacillin, penicillins (including penicillin G and V), piperacillin, temocillin, and ticarcillin; polypeptides such as bacitracin, colistin, and polymyxin B; quinolones such as ciproflaxacin, enoxacin, gatifloxacin, gemifloxacin, levofloxacin, lomefloxacin, moxifloxacin, nadifloxacin, nalidixic acid, norfloxacin, ofloxacin, trovafloxacin, gepafloxacin, sparfloxacin, and temafloxacin; sulfonamides such as mafenide, sulfacetamide, sulfadiazine, sulfadithoxine, sulfamethizole, sulfamethoxazole, sulfanilamide, sulfasalazine, sulfisoxazole, and sulfonamidochrysoidine; tetracyclines such as demeclocycline, doxycycline, metacycline, minocycline, oxytetracycline, and tetracycline.

A pesticide intended for use against fungi is known as a fungicide. Examples of fungicides include acibenzolar, acypetacs, aldimorph, anilazine, aureofungin, azaconazole, azithiram, azoxystrobin, benalaxyl, benodanil, benomyl, benquinox, benthiavalicarb, binapacryl, biphenyl, bitertanol, bixafen, blasticidin-S, boscalid, bromuconazole, captafol, captan, carbendazim, carboxin, carpropamid, chloroneb, chlorothalonil, chlozolinate, cyazofamid, cymoxanil, cyprodinil, dichlofluanid, diclocymet, dicloran, diethofencarb, difenoconazole, diflumetorim, dimethachlone, dimethomorph, diniconazole, dinocap, dodemorph, edifenphos, enoxastrobin, epoxiconazole, etaconazole, ethaboxam, ethirimol, etridiazole, famoxadone, fenamidone, fenarimol, fenbuconazole, fenfuram, fenhexamid, fenoxanil, fenpropidin, fenpropimorph, ferbam, fluazinam, fludioxonil, flumorph, fluopicolide, fluopyram, fluoroimide, fluoxastrobin, flusilazole, flutianil, flutolain, flopet, fthalide, furalaxyl, guazatine, hexaconazole, hymexazole, imazalil, imibenconazole, iminoctadine, iodocarb, ipconazole, iprobenfos, iprodione, iprovalicarb, siofetamid, isoprothiolane, isotianil, kasugamycin, laminarin, mancozeb, mandestrobin, mandipropamid, maneb, mepanypyrim, mepronil, meptyldinocap, mealaxyl, metominostrobin, metconazole, methafulfocarb, metiram, metrafenone, myclobutanil, naftifine, nuarimol, octhilinone, ofurace, orysastrobin, oxadixyl, oxathiapiprolin, oxolinic acid, oxpoconazole, oxycarboxin, oxytetracycline, pefurazate, penconazole, pencycuron, penflufen, penthiopyrad, phenamacril, picarbutrazox, picoxystrobin, piperalin, polyoxin, probenzole, prochloraz, procymidone, propamocarb, propiconazole, propineb, proquinazid, prothiocarb, prothioconazole, pydiflumetofen, pyraclostrobin, pyrametostrobin, pyraoxystrobin, pyrazophos, pyribencarb, pyributicarb, pyrifenox, pyrimethanil, pyrimorph, pyriofenone, pyroquilon, quinoxyfen, quintozene, sedaxane, silthiofam, simeconazole, spiroxamine, streptomycin, tebuconazole, tebufloquin, teclofthalam, tecnazene, terbinafine, tetraconazole, thiabendazole, thifluzamide, thiphanate, thiram, tiadinil, tolclosfos-methyl, folfenpyrid, tolprocarb, tolylfluanid, triadimefon, triadimenol, triazoxide, triclopyricarb, tricyclazole, tridemorph, trifloxystrobin, triflumizole, triforine, validamycin, and vinclozolin.

A pesticide intended for use against plants is known as an herbicide as described above.

A pesticide intended for use against insects is known as an insecticide. Examples of insecticides are: organochlorides such as Aldrin, chlordane, chlordecone, DDT, dieldrin, endofulfan, endrin, heptachlor, hexachlorobenzene, lindane, methoxychlor, mirex, pentachlorophenol, and TDE; organophosphates such as acephate, azinphos-methyl, bensulide, chlorethoxyfos, chlorpyrifos, diazinon, chlorvos, dicrotophos, dimethoate, disulfoton, ethoprop, fenamiphos, fenitrothion, fenthion, malathion, methamdophos, methidathion, mevinphos, monocrotophos, naled, omethoate, oxydemeton-methyl, parathion, phorate, phosalone, phosmet, phostebupirim, phoxim, pirimiphos-methyl, profenofos, terbufos, and trichlorfon; carbamates such as aldicarb, bendiocarb, carbofuran, carbaryl, dioxacarb, fenobucarb, fenoxycarb, isoprocarb, methomyl; pyrethroids such as allethrin, bifenthrin, cyhalothrin, cypermethrin, cyfluthrin, deltamethrin, etofenprox, fenvalerate, permethrin, phenothrin, prallethrin, resmethrin, tetramethrin, tralomethrin, and transfluthrin; neonicotinoids such as acetamiprid, clothiandin, imidacloprid, nithiazine, thiacloprid, and thiamethoxam; ryanoids such as chlorantraniliprole, cyanthaniliprole, and flubendiamide.

A pesticide intended for use against mites is known as a miticide. Examples of miticides are permethrin, ivermectin, carbamate insecticides as described above, organophosphate insecticides as described above, dicofol, abamectin, chlorfenapyr, cypermethrin, etoxazole, hexythiazox, imidacloprid, propargite, and spirotetramat.

A pesticide intended for use against snails and other mollusks is known as a molluscicide. Examples of molluscicides are metaldehyde and methiocarb.

A pesticide intended for use against rodents is known as a rodenticide. Examples of rodenticides are warfarin, coumatetralyl, difenacoum, brodifacoum, flocoumafen, bromadiolone, diphacinone, chlorophacinone, pindone, difethialone, cholecalciferol, ergocalciferol, ANTU, chloralose, crimidine, 1,3-difluoro-2-propanol, endrin, fluroacetamide, phosacetim, pyrinuron, scilliroside, strychnine, tetramethylenedisulfotetramine, bromethalin, 2,4-dinitrophenol, and uragan D2.

A pesticide intended for use against viruses is known as a virucide. Examples of virucides are cyanovirin-N, griffithsin, interferon, NVC-422, scytovirin, urumin, virkon, zonroz, and V-bind viricie.

A persistent organic contaminant is a toxic organic chemical that adversely affects human and environmental health, can be transported by wind and water, and can persist for years, decades, or centuries owing to resistance to environmental degradation by natural chemical, biological, or photolytic processes. Persistent organic contaminants are regulated by the United Nations Environment Programme 2001 Stockholm Convention on Persistent Organic Contaminants. Examples of persistent organic contaminants are Aldrin, chlordane, dieldrin, endrin, heptachlor, hexachlorobenzene, mirex, toxaphene, polychlorinated biphenyl (PCBs), dichlorodiphenyltrichloroethane (DDT), dioxins, polychlorinated dibenzofurans, chlordecone, hexachlorocyclohexane ($\alpha$- and $\beta$-), hexabromodiphenyl ether, lindane, pentachlorobenzene, tetrabromodiphenyl ether, perfluorooctanesulfonic acid, endosulfans, and hexabromocyclododecane.

As used herein, the term 'unimodal' refers to a distribution or pattern that has a single peak or mode. In the context of particle size or material properties, it indicates that the sample consists of particles or components that are primarily of one size or characteristic, rather than varying widely in size or composition.

As used herein, the term 'spinel interplanar spacing' refers to the distance between parallel planes of atoms in the crystal structure of a spinel material. Spinel is a type of mineral with a specific crystalline arrangement, represented by the general formula $AB_2O_4$, where 'A' and 'B' are metal ions. The interplanar spacing is crucial for understanding the material's structural properties and is typically measured using X-ray diffraction (XRD) techniques.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

Aspect of the present disclosure is directed to a method of forming a nanocomposite of graphitic carbon nitride (g-$C_3N_4$), molybdenum oxide ($MoO_3$), and magnesium aluminate ($MgAl_2O_4$)($C_3N_4$@$MoO_3$/$MgAl_2O_4$). Each component of the nanocomposite, when used in appropriate ratios, is effective in the photodegradation of organic contaminants in water with high efficiency and photodegradation activity.

A nanocomposite (g-$C_3N_4$@$MoO_3$/$MgAl_2O_4$) including g-$C_3N_4$, $MoO_3$, and $MgAl_2O_4$ is described. The nanocomposite includes coating of g-$C_3N_4$ on $MoO_3$ and $MgAl_2O_4$. The g-$C_3N_4$, $MoO_3$, and $MgAl_2O_4$ are present in the nanocomposite in a mass relationship to each other in a range of from 5 to 15:2 to 7:75 to 95, preferably 7 to 13:3 to 6:80 to 90, and preferably 9 to 11:4 to 5:84 to 86. The g-$C_3N_4$, $MoO_3$, and $MgAl_2O_4$ may be present in the nanocomposite in a mass relationship to each other of 10:5:85, and may tolerate variations such as ±1.0, ±0.5, ±0.2, ±0.1, or ±0.01. The nanocomposite can exhibit excellent performance in photodegradation of organic pollutants, hydrogen generation, and anticancer activity. The material may demonstrate enhanced catalytic properties, high surface reactivity, and efficient adsorption, making it suitable for applications in environmental remediation, energy production, and biomedical treatments.

The nanocomposite obtained may include no molybdenum sulfide ($MoS_2$), and/or the nanocomposite obtained may include no sulfide, particularly no added $Mo_2S$ and/or sulfide. The nanocomposite may include no more than 0.01, 0.001, or 0.0001 wt. % $Mo_2S$ and/or sulfide, e.g., no detectable $Mo_2S$ and/or sulfide, based on total nanocomposite weight. The nanocomposite obtained may include less than 10 wt. % Co, or less than 7.5, 5, 2.5, 1, or 0.5 wt. % Co, relative to total nanocomposite weight. The nanocomposite obtained may include less than 1 wt. % Co, preferably less than 0.9 wt. % Co, preferably less than 0.8 wt. % Co, preferably less than 0.7 wt. % Co, preferably less than 0.6 wt. % Co, preferably less than 0.5 wt. % Co, preferably less than 0.4 wt. % Co, preferably less than 0.3 wt. % Co, preferably less than 0.2 wt. % Co, preferably less than 0.1 wt. % Co, preferably less than 0.05 wt. % Co, and preferably less than 0.01 wt. % Co. The nanocomposite obtained may contain no added Co (only inevitable traces). The exclusion of $MoS_2$, sulfide, and the minimization of Co content in the nanocomposite may ensure the preservation of its desired catalytic properties, stability, and reactivity. The absence of $MoS_2$ and sulfide can prevent undesirable side reactions, while limiting the Co content to less than 1 wt. % prevents interference and potential toxicity, thereby enhancing the performance and applicability of the nanocomposite.

The nanocomposite may be porous. A porous material is the one that forms a porous bulk solid. Pores may be micropores, mesopores, macropores, and/or a combination thereof. The pores exist in the bulk material, not necessarily in the molecular structure of the material. The term 'microporous' means that nanocomposite have pores with an average pore width (i.e. diameter) of less than 2 nm, e.g., in a range with an upper limit of 2, 1, 0.9, 0.75, 0.5, 0.25, 0.1, 0.05, or 0.01 nm, and/or a lower limit of 0.00001, 0.0001, 0.001, 0.01, 0.1, 0.25, 0.5, 0.75, or 1 nm. The term 'mesoporous' means the pores of the nanocomposite have an average pore width of 2 to 50 nm, though this may include subranges within this general range, e.g., a minimum diameter of 2, 3, 5, 10, 15, 20, 25, or 35 m, and/or a maximum diameter of 50, 45, 40, 35, 30, 25, 20, 15, or 10 nm. The term 'macroporous' means the pores of nanocomposite have an average pore width larger than 50 nm, e.g., at least 55, 75, 100, 250, 500, 750, or 1000 nm. Pore size may be determined by methods including, but not limited to, gas adsorption (e.g. $N_2$ adsorption), mercury intrusion porosimetry, and imaging techniques such as scanning electron microscopy (SEM), and X-ray computed tomography (XRCT).

A Brunauer-Emmett-Teller (BET) surface area of the nanocomposite may be in a range of from 8 to 12 square meters per gram ($m^2/g$), preferably 9 to 11 $m^2/g$, and preferably 10 $m^2/g$, though these endpoints may vary by ±2.5, 2, 1.5, 1, 0.5, or 0.1, for example. The BET surface area on the nanocomposite may be 10.1±2.5, 2, 1.5, 1, 0.5, or 0.1 $m^2/g$, for example. The BET hypothesis is the foundation for a significant analysis method for determining the specific surface area of a material. It attempts to explain the physical adsorption of gas molecules on a solid surface. Specific surface area is a property of solids, which is the total surface area of a material per unit of mass, solid or bulk volume, or cross-sectional area. In some embodiments, pore diameter, pore volume, and BET surface area are measured by gas adsorption analysis, preferably $N_2$ adsorption analysis (e.g., $N_2$ adsorption isotherms).

The average pore distribution of the nanocomposite may include, but is not limited to, crystalline average pore distribution, bimodal, trimodal, multimodal, narrow, broad, and Gaussian. In a preferred embodiment, the average pore distribution of nanocomposite is unimodal, indicating a single dominant pore size within the material. This unimodal distribution suggests that the nanocomposites possess a relatively narrow pore size range, resulting in more uniform pore structures and enhancing specific properties such as adsorption capacity, catalytic activity, or surface reactivity.

An average pore diameter of the nanocomposite, according to Barrett-Joyner-Halenda (BJH) measurement method, is in a range of from 5 to 15 nm, preferably 6 to 14 nm, preferably 7 to 13 nm, preferably 8 to 12 nm, and preferably 9 to 11 nm. The nanocomposite may have an average pore diameter of 8.34±2.5, 2, 1.5, 1, 0.5, 0.1, 0.05, 0.025, or 0.01 nm.

An average pore volume of the nanocomposite, according to the BJH measurement method, is in a range of from 0.01 to 0.5 $cm^3/g$, preferably 0.02 to 0.4 $cm^3/g$, preferably 0.03 to 0.3 $cm^3/g$, preferably 0.04 to 0.2 $cm^3/g$, and preferably 0.05 to 0.1 $cm^3/g$. In a preferred embodiment, the average pore volume of the nanocomposite 0.033±0.1, 0.05, 0.025, or 0.01 $cm^3/g$.

The mass relationship of the nanocomposite may be in a range of from 9 to 11:4 to 6:84 to 86, and preferably 9.5 to 10.5:4.5 to 5.5:84.5 to 85.5. The mass relationship of the nanocomposite is 10:5:85, wherein the ratios may vary by ±3, 2.5, 2, 1.5, 1, 0.5, 0.25, or 0.1.

The nanocomposite may have a (311) spinel interplanar spacing in a range of from 0.205 to 0.285 nm, preferably 0.215 to 0.275 nm, preferably 0.225 to 0.265 nm, and preferably 0.235 to 0.255 nm; (411) $MoO_3$ interplanar spacing in a range of from 0.150 to 0.230 nm, preferably 0.160 to 0.220 nm, preferably 0.170 to 0.210 nm, and preferably 0.180 to 0.200 nm; (511) spinel interplanar spacing in a range of from 0.115 to 0.195 nm, preferably 0.125 to 0.185 nm, preferably 0.135 to 0.175 nm, and preferably 0.145 to 0.165 nm; (311) MgO interplanar spacing in a range of from 0.087 to 0.167 nm, preferably 0.097 to 0.157 nm, preferably 0.107 to 0.147 nm, and preferably 0.117 to 0.137 nm; (622) spinel interplanar spacing in a range of from 0.080 to 0.160 nm, preferably 0.090 to 0.150 nm, preferably 0.100 to 0.140 nm, and preferably 0.110 to 0.130 nm, according to selected area diffraction (SAED).

The nanocomposite may have a (311) spinel interplanar spacing of 0.245±2% nm, (411) $MoO_3$ interplanar spacing of 0.19±2% nm, (511) spinel interplanar spacing of 0.155±2% nm, (311) MgO interplanar spacing of 0.127±2% nm, and (622) spinel interplanar spacing of 0.12±2% nm, according to SAED.

In some embodiments, an X-ray diffraction (XRD) spectrum of the nanocomposite under Cu-filtered CuKα radiation (1.5418 Å) powered at 45 kilovolt (kV) and 10 milliampere (mA) has 2θ peaks of an $MoO_3$ hexagonal phase at 18.7±1°, 28.7±1°, 33.0±1°, 33.8±1°, 36.8±1°, and 42.8±1°, an $MgAl_2O_4$ spinel phase at 19.3±1°, 36.8±1°, 44.6±1°, 59.3±1°, and 65.0±1°; an MgO cubic phase at 42.8±1°, 62.2±1°, and 74.6±1°; and g-$C_3N_4$-related diffractions at 27.8±1°, 36.8±1°, 44.6±1°, and 59.3±1°. In some embodiments, no more than 1, 0.5, or 0.1% relative intensity $Al_2O_3$ is detected in the XRD spectrum. The minimal presence of $Al_2O_3$ (less than 1%) in the nanocomposite is critical to maintaining its enhanced catalytic properties, high surface reactivity, and efficient adsorption. This ensures desired performance in environmental remediation, energy production, and biomedical applications, free from interference by less reactive $Al_2O_3$ phases. In some embodiments, the $MoO_3$ in the nanocomposite has a hexagonal crystal structure. In alternate embodiments, $MoO_3$ may exist in other crystal phases including cubic, monoclinic, tetragonal, rhombohedral, and orthorhombic phases. In a preferred embodiment, the hexagonal phase of $MoO_3$ is represented by diffractions at 2θ values of 18.7, 28.7, 33.0, 33.8, 36.8, and 42.8°. At 2θ values of 42.8, 62.2, and 74.6°, the cubic phase of MgO is detected. At 2θ values of 19.3, 36.8, 44.6, 59.3, and 65.01°.

$MgAl_2O_4$ may have a spinel phase. The spinel phase may be a mixed oxide with the general formula $AB_2O_4$, including one divalent cation ($A^{2+}$) and two trivalent cations ($B^{3+}$). The unit cell consists of a face-centered cubic arrangement of oxygen ions, containing 32 $O^{2-}$ ions, with 64 tetrahedral and 32 octahedral sites occupied by $A^{2+}$ and $B^{3+}$ cations. When one half of the octahedral interstices are occupied by $B^{3+}$ cations and one-eighth of the tetrahedral sites are occupied by $A^{2+}$ cations, the spinel phase is termed "normal." Conversely, when tetrahedral sites are occupied by half of the $B^{3+}$ and octahedral sites by the other half along with $A^{2+}$, the spinel phase is termed "inverse."

The spinel phase with the chemical formula $MgAl_2O_4$ is a mineral type of this oxide family. $MgAl_2O_4$ has been widely used in various applications, such as in metallurgical, electrochemical, radio-technical, and chemical industrial fields owing to its high thermal stability (melting point at 2135° C., high hardness (16 gigapascal (GPa)), high mechanical resistance, high resistance against chemical attack, wide band gap energy, high electrical resistivity, relatively low thermal expansion coefficient ($9 \cdot 10^{-6}$ l/° C.) between 3° and 1400° C., low dielectric constant, low density (3.58 gram per cubic centimeter (g/cm$^3$)), high thermal shock resistance, hydrophobicity, and low surface acidity.

Figure 1:
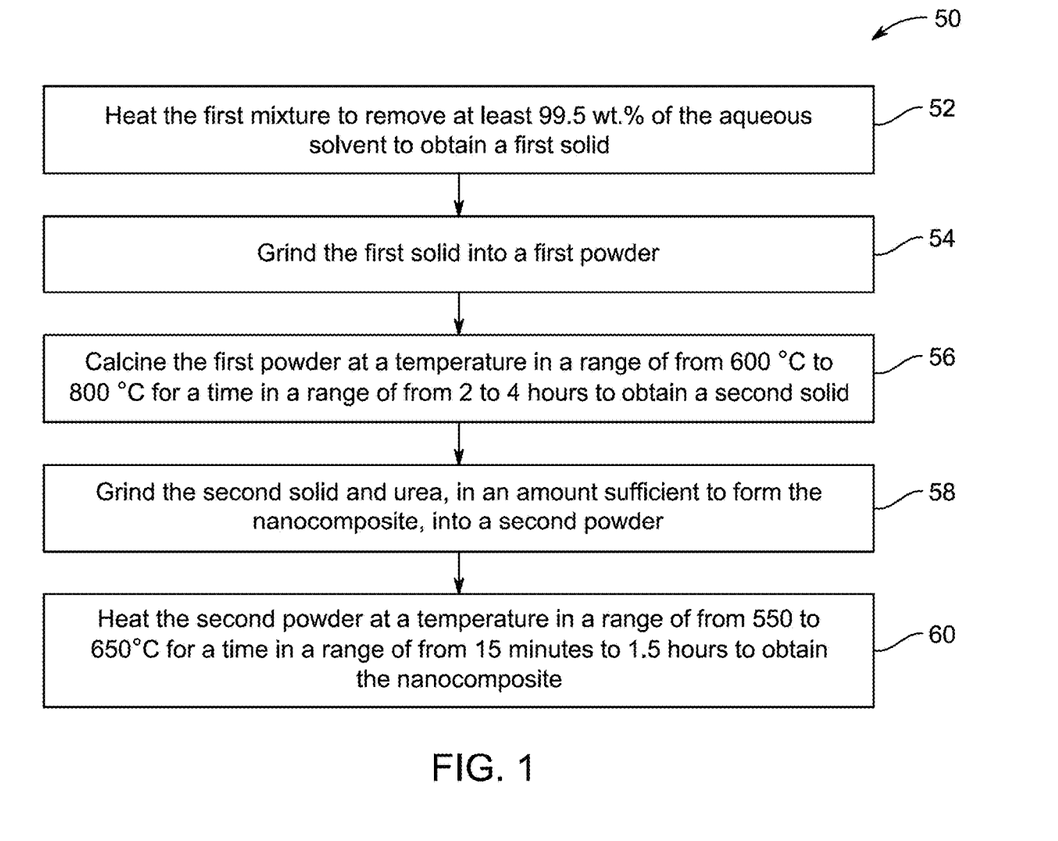
FIG. 1 is an exemplary flow chart of a method of manufacturing a nanocomposite of graphitic carbon nitride (g-C₃N₄), molybdenum oxide (MoO₃), and magnesium aluminate (MgAl₂O₄)(C₃N₄@MoO₃/MgAl₂O₄), according to inventive embodiments.

FIG. 1 illustrates a schematic flow chart of a method 50 of manufacturing the ($C_3N_4$@$MoO_3$/$MgAl_2O_4$) nanocomposite. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes combining a magnesium salt, aluminum salt, and a molybdate salt in stoichiometric proportions within 5 mole percent (mol. %) in an aqueous solvent including a carbon source, to obtain a first mixture. In some embodiments, the magnesium salt may include, but is not limited to, magnesium chloride, magnesium sulfate, magnesium carbonate, magnesium oxide, magnesium fluoride, magnesium bromide, magnesium iodide, magnesium hydroxide, magnesium citrate, magnesium malate, magnesium lactate, magnesium gluconate, magnesium ascorbate, magnesium tartrate, magnesium perchlorate, magnesium phosphate, magnesium stearate, magnesium pyrophosphate, magnesium silicate, magnesium borate, magnesium nitrate, magnesium formate, magnesium acetate, magnesium hypophosphite, magnesium tungstate, magnesium thiosulfate, magnesium nitride, magnesium aluminate, and magnesium succinate. In a preferred embodiment, the magnesium salt is magnesium nitrate ($Mg(NO_3)_2$).

In some embodiments, the aluminum salts may include, but are not limited to, aluminum nitrate, aluminum chloride, aluminum sulfate, and aluminum acetate. In some embodiments, the aluminum salts may include, but are not limited to, aluminum bromide, aluminium nitrate, aluminum fluoride, aluminum iodide, aluminum thiocyanate, aluminum formate, and aluminum lactate. In a preferred embodiment, the aluminum salt is aluminium nitrate ($Al(NO_3)_3$).

In some embodiments, the molybdate salts may include, but are not limited to, ammonium molybdate, sodium molybdate, potassium molybdate, and calcium molybdate. Other molybdate salts may include, but are not limited to, lithium molybdate, magnesium molybdate, barium molybdate, zinc molybdate, and copper molybdate. In a preferred embodiment, the molybdate salt is ammonium molybdate (($NH_4)_2MoO_4$).

In some embodiments, the carbon source may include, but is not limited to, sucrose, fructose, glucose, maltose, dextrose, corn syrup, lactose, glycerol, mannitol, sorbitol, menthol, and cellulose. In some embodiments, the carbon source includes menthol. In some embodiments, the carbon source includes dextrose.

At step 54, the method 50 includes heating the first mixture to remove the aqueous solvent to obtain a first solid. The heating of the first mixture removes the aqueous solvent such that the first solid is a solid that can be ground to a powder without further solvent removal. An aqueous solvent is a solvent in which water serves as the primary medium for dissolving other substances. Water is considered a polar solvent, which enables it to dissolve a wide variety of ionic and polar compounds. Water may be tap water, distilled water, double-distilled water, deionized water, deionized distilled water, reverse osmosis water, and/or some other water. Examples of aqueous solvents include water itself, as well as solutions like sodium chloride solution, acetic acid solution, ethanol solution, hydrochloric acid solution, sodium hydroxide solution, ammonia solution, hydrogen peroxide solution, and sodium bicarbonate solution. Other examples include potassium permanganate solution, citric acid solution, potassium chloride solution, glycerol solution, urea solution, calcium chloride solution, magnesium sulfate solution, sodium acetate solution, formic acid solution, and sodium nitrate solution. In a preferred embodiment, the aqueous solvent is distilled water.

In some embodiments, the heating can be performed by using heating appliances such as ovens, microwaves, autoclaves, hot plates, heating mantles and tapes, oil baths, salt baths, sand baths, air baths, hot-tube furnaces, and hot-air guns. In some embodiments, the heating the first mixture removed at least 99.5 wt. % of the aqueous solvent to obtain the first solid. In some embodiments, the heating of the first mixture obtains the first solid with at least 99.9 wt. % of the aqueous solvent removed.

At step 56, the method 50 includes grinding the first solid into a powder. In some embodiments, the first powder in the calcination has various salts. In a preferred embodiment, the first powder in the calcining includes no melamine. The grinding may be carried out using any suitable means, for example, ball milling, blending, etc., using manual method 100s (e.g., mortar) or machine-assisted method 100s such as using a mechanical blender, or any other apparatus known to those of ordinary skill in the art. Grinding provides efficient and consistent particle size reduction. In a preferred embodiment, the first solid is ground using a mortar pestle into a powder.

At step 58, the method 50 includes calcining the first powder at a temperature in a range of from 600 to 800° C. for a time in a range of from 2 to 4 hours (h) to obtain a second solid. The calcination of the precipitate is carried out by heating it to a high temperature, under a restricted supply of ambient oxygen. This is performed to remove impurities or volatile substances and to incur thermal decomposition. Typically, the calcination is carried out in a furnace preferably equipped with a temperature control system, which may provide a heating rate of up to 50° C. per minute (° C./min), preferably up to 40° C./min, preferably up to 30° C./min, preferably up to 20° C./min, preferably up to 10° C./min, preferably up to 5° C./min, preferably up to 2° C./min, and preferably up to 1° C./min. The calcining may be performed under an open or closed environment, or a combination of these, and may be anaerobic, in an inert environment, in an ambient atmosphere, with a reactive gas, such as $H_2$, or in combinations of these, as desired.

In some embodiments, the powder is calcined at a range of from 600 to 800° C., preferably 610 to 790° C., preferably 620 to 780° C., preferably 630 to 770° C., preferably 640 to 760° C., preferably 650 to 750° C., preferably 660-740° C., preferably 670-730° C., preferably 680-720° C., and preferably 690 to 710° C. for a time in a range of from 2 to 4 h, 2.5 to 3.5 h, or 2.75 to 3.25 h, to obtain a second solid. The powder may be calcined at a range of from 675-725° C., preferably 680 to 720° C., preferably 685 to 715° C., preferably 690 to 710° C., preferably 695 to 705° C. for a time in a range of from 2.75 to 3.25 h, preferably 2.8 to 3.2 h, or 2.9 to 3.1 h. The powder may be calcined at 700° C. for 3 h.

At step 60, the method 50 includes grinding the second solid and urea, in an amount sufficient to form the nanocomposite, into a second powder. In alternate embodiments, nitrogen-containing precursors may include, but not limited to, melamine, dicyandiamide, ammonium thiocyanate, or ammonium carbonate. These alternatives provide nitrogen necessary for the formation of carbon nitride structures. Typically, these precursors are used in amounts of approximately 5 wt. % relative to the total weight of the nanocomposite to achieve desired nitrogen content for the desired structural properties.

At step 62, the method 50 includes heating the second powder in a range of from 550 to 650° C. for a time in a range of from 15 min (0.25 h) to 1.5 h to obtain the nanocomposite, including graphitic $C_3N_4$, $MoO_3$, and $MgAl_2O_4$ in a mass relationship to each other in a range of from 5 to 15:2 to 7:75 to 95. In some embodiments, the heating temperature ranges from 550 to 650° C., preferably 560 to 640° C., preferably 570 to 630° C., preferably 580 to 620° C., preferably 590 to 610° C., and yet more preferably 600° C. for a time in a range of from 15 min (0.25 h) to 1.5 h, preferably 0.3 h to 1.4 h, preferably 0.4 h to 1.3 h, preferably 0.5 h to 1.2 h, preferably 0.6 h to 1.1 h, preferably 0.7 h to 1.0 h, and preferably 0.8 h to 0.9 h to obtain the nanocomposite, including graphitic $C_3N_4$, $MoO_3$, and $MgAl_2O_4$ in a mass relationship to each other in a range of from 5 to 15:2 to 7:75 to 95, preferably 7 to 13:3 to 6:80 to 90, and preferably 9 to 11:4 to 5:84 to 86. In some embodiments, the heating of the second powder is at a temperature in a range of from 590-610° C., preferably 592 to 608° C., preferably 594 to 606° C., preferably 596 to 604° C., and preferably 598 to 602° C. for a time in a range of from 55 min to 1.1 h, and preferably 1 h. In a preferred embodiment, the method includes heating the second powder at 600° C. for 1 h to obtain the nanocomposite, including graphitic $C_3N_4$, $MoO_3$, and $MgAl_2O_4$ in a mass relationship of 10:5:85. The second powder may be heated by using heating appliances such as hot plates, furnace, heating mantles ovens, microwaves, autoclaves, tapes, oil baths, salt baths, sand baths, air baths, hot-tube furnaces, and hot-air guns. In a preferred embodiment, the second powder is heated in a furnace in a crucible. Like the calcining, the heating may be performed under an open or closed environment, with respect to gas flow, or a combination of these, and may be anaerobic, in an inert environment, in an ambient atmosphere, e.g., optionally a circulating gas, which may be inert), with a reactive gas such as $H_2$, or in combinations of these, as desired.

EXAMPLES

The following examples demonstrate a method of manufacturing a nanocomposite of graphitic carbon nitride (g-$C_3N_4$), molybdenum oxide ($MoO_3$), and magnesium aluminate ($MgAl_2O_4$)($C_3N_4$@$MoO_3$/$MgAl_2O_4$) using dextrose. The examples are provided solely for illustration and are not to be construed as limitations of the present disclosure, as many variations thereof are possible without departing from the spirit and scope of the present disclosure.

Example 1: Fabrication of g-$C_3N_4$@$MoO_3$/ $MgAl_2O_4$ (10:5:85, wt. %) Nanohybrid According to the present disclosure, magnesium nitrate, and aluminum nitrate were added together in one beaker with ammonium molybdate, in predetermined amount, to produce a 10% $MoO_3$/$MgAl_2O_4$. Further, about 10 g of menthol as fuel was added to the beaker, followed by 30 milliliters (mL) of distilled water. The beaker was heated till a clear solution was obtained, heated further till dryness. The product was ground in a mortar, transferred to a 150 mL porcelain dish, and calcined at 700 degrees Celsius (° C.) for 3.0 hours (h). Furthermore, the 10% $MoO_3$/$MgAl_2O_4$ product was cooled down to room temperature and weighed, ground with urea in an amount suitable (here 2 g of urea to 20 g of triple metal oxide, but depending upon the reaction conditions, this may be 5, 10, 15, 20, 25, 33, 50, 100, 150, 250, 500, or 1000 parts by weight of urea to 100 parts by weight of 10% $MoO_3$/$MgAl_2O_4$) to produce g-$C_3N_4$@$MoO_3$/$MgAl_2O_4$ (10:5:85, wt. %) nanohybrid. The quadruple mixture was returned, and heated to 600° C. for 1.0 h in a covered porcelain crucible, and subsequently, the g-$C_3N_4$@$MoO_3$/$MgAl_2O_4$ (10:5:85, wt. %) nanohybrid was collected.

Example 2: Characterization

X-ray diffraction (XRD) was used to identify the crystalline states in each specimen studied, employing the JDX-8030 X-ray (JEOL), made in Japan. Cu-filtered Cu-Kα radiation (1.5418 angstroms (Å)) powered at 45 kV and 10 mA was used to run the patterns. The specimens were tested at ambient temperatures in a range of $2\theta=5°$ to 80°. The surface morphologies of the obtained samples were analyzed by transmission electron microscopy (TEM), selected area electron diffraction (SAED), and high-resolution transmission electron microscopy (HRTEM) images, obtained using a Tecnai-G20 (USA) transmission electron microscope with a 200 kV speed voltage. Nitrogen ($N_2$) adsorption isotherm obtained at 77 K using Micrometrics ASAP 2020 Brünauer-Emmett-Teller (BET) analyzer was used to calculate the surface characteristics, specifically the BET surface area, total pore volume (Vp), and mean pore radius (r). Before beginning the measurement, the samples were outgassed for three h at 200° C. with a decreased pressure of $10^{-5}$ Torr.

Results and Discussion

Figure 2:
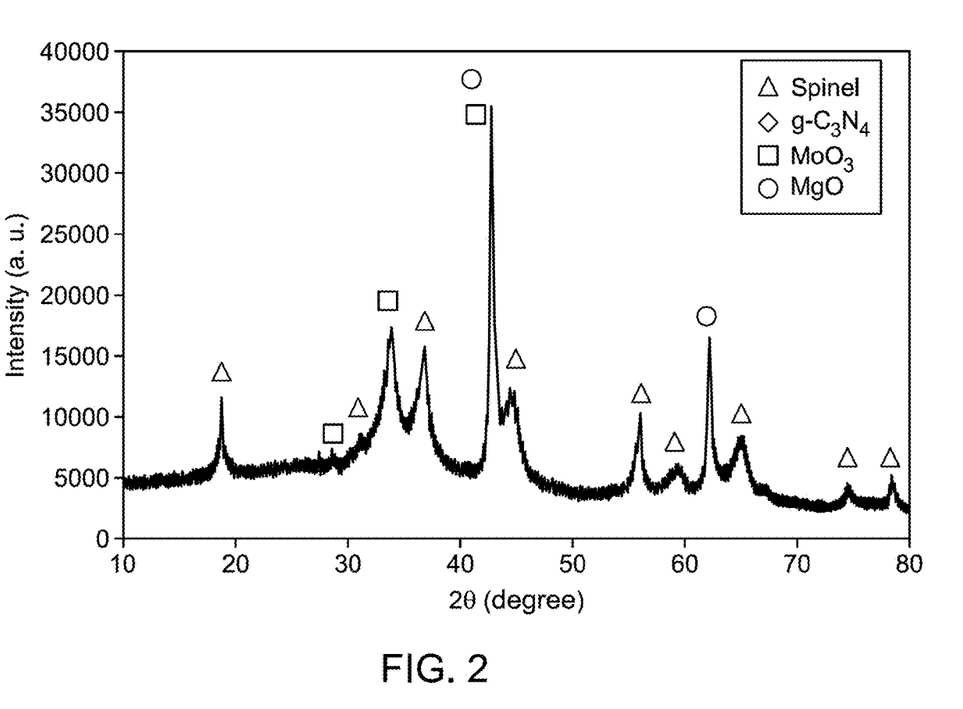
FIG. 2 is a graph depicting X-ray diffraction (XRD) patterns of g-C₃N₄@MoO₃/MgAl₂O₄ nanocomposite, according to inventive embodiments.

As mentioned above, XRD was used to examine the crystallinity and phase identification of the g-$C_3N_4$@$MoO_3$/$MgAl_2O_4$ catalyst, the results are depicted in FIG. 2. As can be seen from FIG. 2, high crystalline nature of the powders is indicated by the strong peaks. $MoO_3$, MgO, $MgAl_2O_4$, and g-$C_3N_4$ phases are detected when the diffraction patterns are compared to the normal JCPDS cards. The hexagonal phase of $MoO_3$ is represented by diffractions at 2θ values of 18.7°, 28.7°, 33.0°, 33.8°, 36.8°, and 42.8° (JCPDS No. 00-021-0569). At 2θ values of 42.8°, 62.2°, and 74.6°, the cubic phase of MgO (JCPDS card, No. 45-0946) was detected. At 2θ values of 19.3°, 36.8°, 44.6°, 59.3°, and 65.01°, $MgAl_2O_4$ spinel was discovered. The cubic phase of $MgAl_2O_4$ spinel is identified by these diffractions (JCPDS card, No. 21-1152). It was previously reported that MgO was present together with the $MgAl_2O_4$ spinel phase. The g-$C_3N_4$-related diffractions were detected at 27.8°, 36.8°, 44.6°, and 59.3°. The production of g-$C_3N_4$@$MoO_3$/$MgAl_2O_4$ was shown by the absence of additional phases (such as $Al_2O_3$).

Figure 3A:
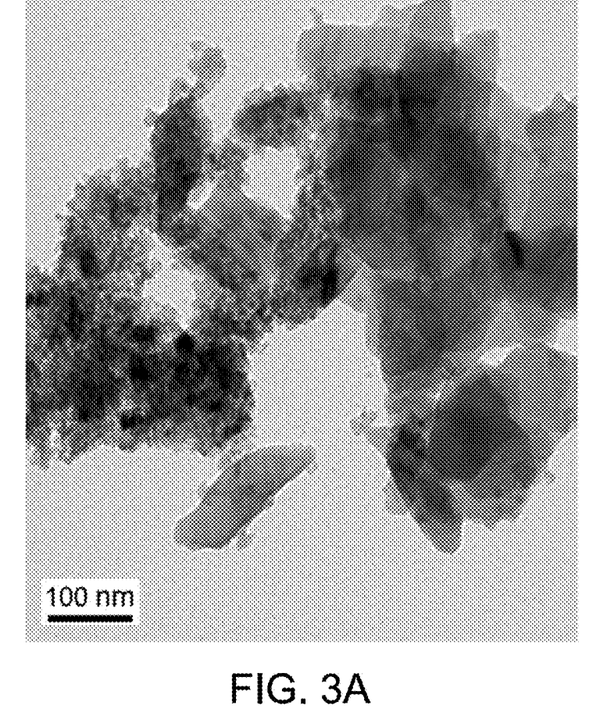
FIG. 3A is a transmission electron microscopy (TEM) image of the g-C₃N₄@MoO₃/MgAl₂O₄ nanocomposite, according to inventive embodiments.
Figure 3B:
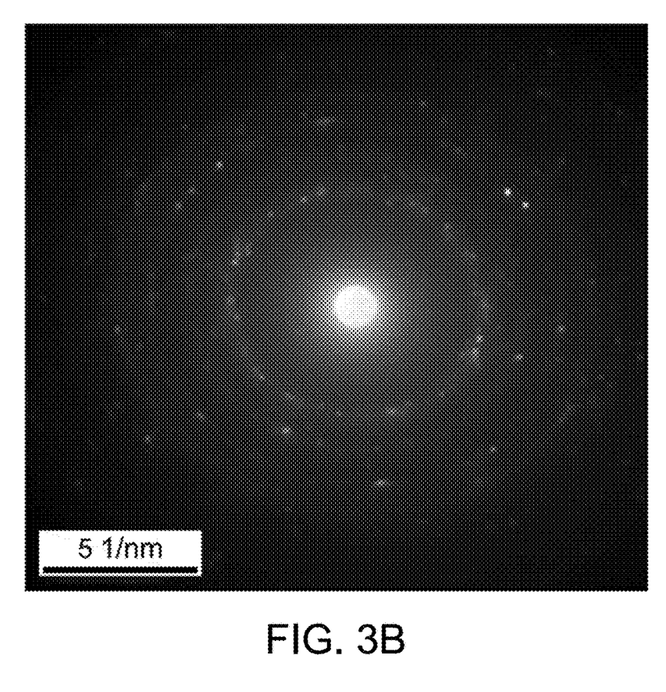
FIG. 3B depicts the selected area electron diffraction (SAED) analysis result for the g-C₃N₄@MoO₃/MgAl₂O₄ nanocomposite, according to inventive embodiments.
Figure 3C:
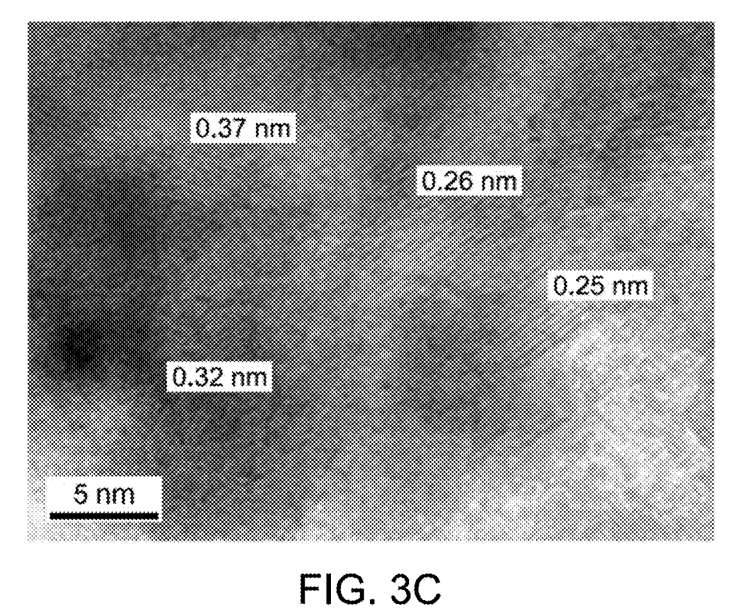
FIG. 3C is a high-resolution transmission electron microscopy (HRTEM) image of the g-C₃N₄@MoO₃/MgAl₂O₄ nanocomposite, according to inventive embodiments.
Figure 3D:
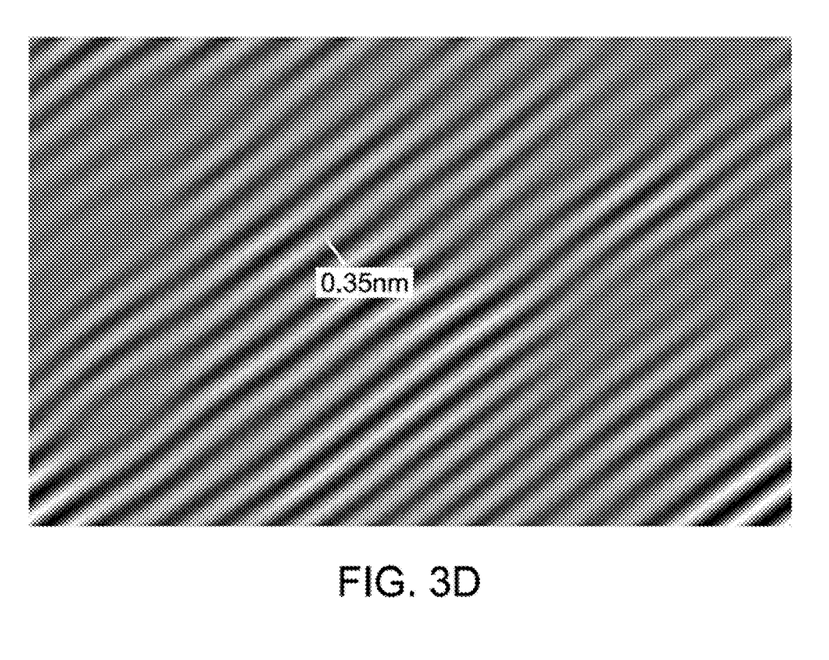
FIG. 3D is a fast Fourier transform (FFT) spectra of the g-C₃N₄@MoO₃/MgAl₂O₄ nanocomposite, according to inventive embodiments.
Figure 3E:
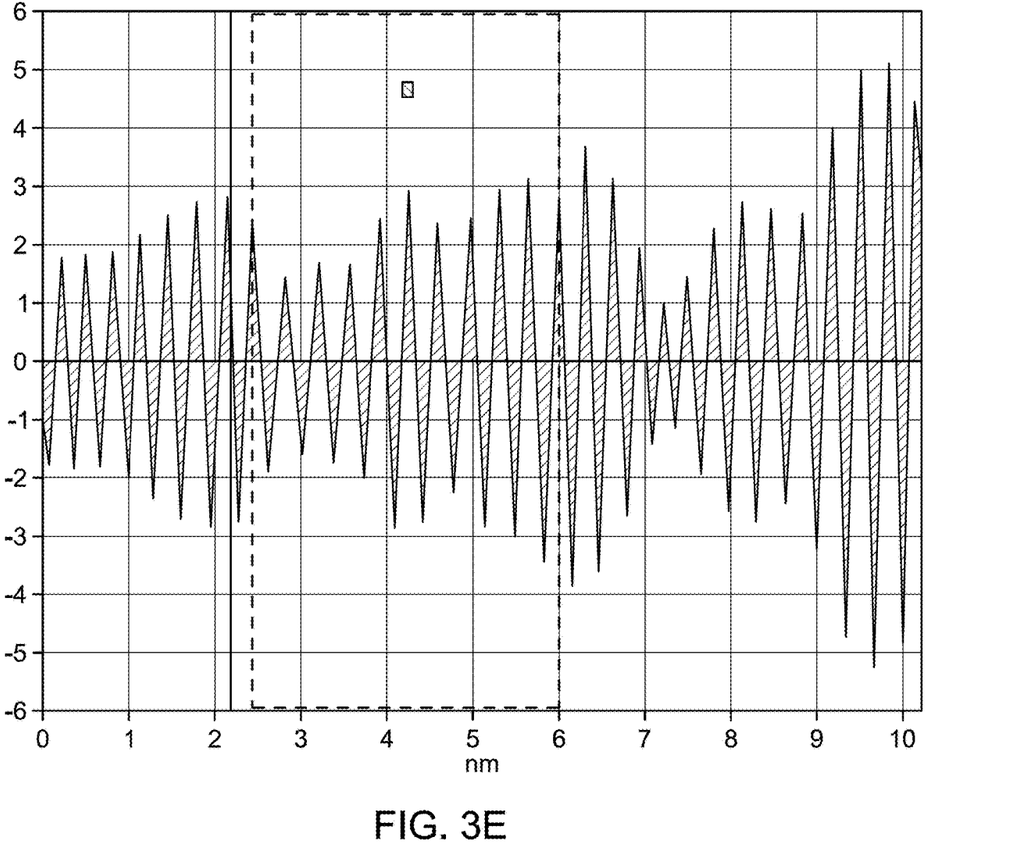
FIG. 3E is an inverse fast Fourier transform (IFFT) spectra of the g-C₃N₄@MoO₃/MgAl₂O₄ nanocomposite, according to inventive embodiments.

Further, TEM images of g-$C_3N_4$@$MoO_3$/$MgAl_2O_4$ nanocomposite are shown in FIG. 3A. The TEM image shows the dispersion of homogeneous spherical metal oxides nanoparticles with size 9.4 nm on two-dimensional porous structure constructed with curled and wrinkled nanosheets and platelets of the g-$C_3N_4$. The corresponding SAED pattern reveals diffraction spots with interplanar spacing of 0.245 nm, 0.19 nm, 0.155 nm, 0.127 nm, 0.12 nm, due to (311, spinel), (411, $MoO_3$), (511, spinel), (311, MgO), and (622, spinel) diffraction planes, as shown in FIG. 3B. The corresponding HRTEM of the composite shows a plane spacing of 0.34 nm related to the (002) of CN, where 0.25 nm and 0.24 nm relates to (311) planes of spinel as well as (410) of $MoO_3$, and 0.32 nm relates to (210) plane of $MoO_3$, characterizing the heterostructure formation, as shown in FIG. 3C. The fast Fourier transform (FFT) and inverse fast Fourier transform (IFFT) measurements show a d value of 0.35 nm given to g-$C_3N_4$@$MoO_3$/$MgAl_2O_4$ nanocomposite, signifying the lattice spacing of (002), indicating the development of g-$C_3N_4$ structure, as shown in FIGS. 3D-3E.

Figure 4A:
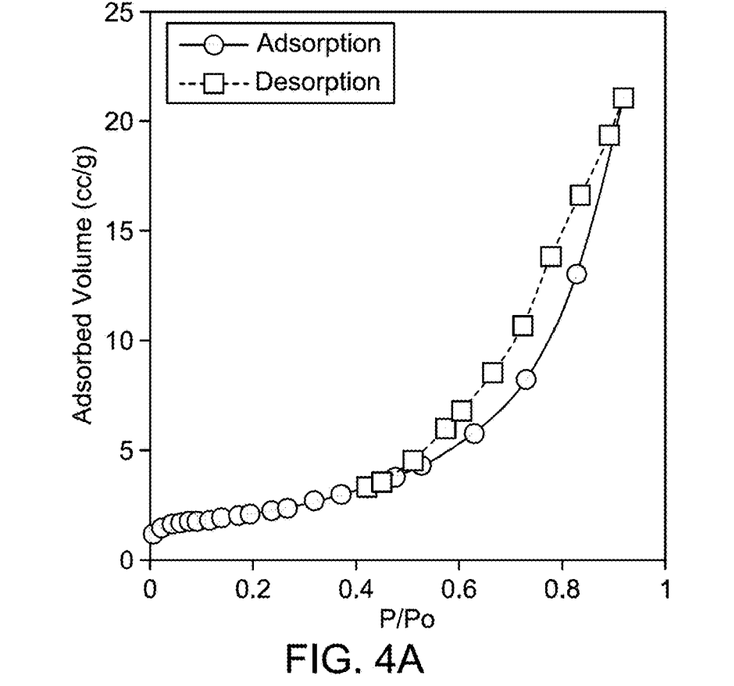
FIG. 4A is a graph depicting nitrogen adsorption-desorption isotherm of the g-C₃N₄@MoO₃/MgAl₂O₄ nanocomposite, according to inventive embodiments.
Figure 4B:
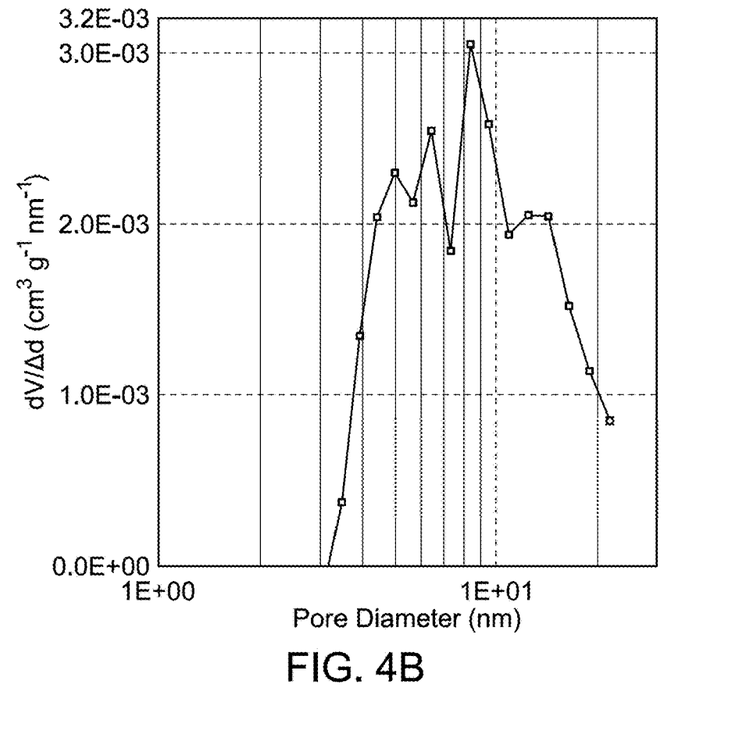
FIG. 4B is a graph depicting the pore size distribution of the g-C₃N₄@MoO₃/MgAl₂O₄ nanocomposite, according to inventive embodiments.

According to the present disclosure, FIG. 4A shows the nitrogen adsorption-desorption isotherms of g-$C_3N_4$@$MoO_3$/$MgAl_2O_4$ nanocomposite. FIG. 4B is a graph depicting the pore size distribution of the g-$C_3N_4$@$MoO_3$/$MgAl_2O_4$ nanocomposite. The nitrogen sorption isotherm of the composite relates to type IV with clear hysteresis loop, indicating the formation of mesoporous structures. However, shifting the loop to a relatively lower pressure (P/P°=0.51 to 1) suggests a decrease in the size of the mesopores, which may result from the deposition of metal oxides particles in the wide pores of g-$C_3N_4$. Furthermore, the BET surface area of the g-$C_3N_4$@$MoO_3$/$MgAl_2O_4$ sample was calculated to be 10.1 m$^2$/g. The marked high specific surface area reflects the good dispersion of the aforementioned metal oxides nanoparticles on g-$C_3N_4$. Moreover, the pore size distribution curves, plotted using the BJH method, for the g-$C_3N_4$@$MoO_3$/$MgAl_2O_4$ sample exhibited unimodal distribution with average pore diameters maximized at 8.34 nm and pore volume of 0.033 cm$^3$/g. The isotherm belongs to the category H3 type of pores, which do not exhibit limiting adsorption at high P/P° and may arise due to aggregation of plate-like particles giving rise to slit-shaped pores. The aforementioned observation indicates that the assembly of g-$C_3N_4$@$MoO_3$/$MgAl_2O_4$ composite provoked a mesoporous array.

Numerous modifications and variations of the present disclosure are possible in light of the above teachings. It is therefore to be understood that within the scope of the appended claims, the invention may be practiced otherwise than as specifically described herein.

The invention claimed is:

1. A method of manufacturing a nanocomposite, the method including:
   combining a magnesium salt, an aluminum salt, and a molybdate salt in stoichiometric proportions within 5 mole percent (mol. %) in an aqueous solvent including a carbon source, to obtain a first mixture;
   heating the first mixture to remove at least 99.5 wt. % of the aqueous solvent to obtain a first solid;
   grinding the first solid into a first powder;
   calcining the first powder at a temperature in a range of from 600° C. to 800° C. for a time in a range of from 2 to 4 hours (h) to obtain a second solid;
   grinding the second solid and urea in a ratio of 2 to 100 parts of the urea per 1 part of the second solid, to form the nanocomposite, into a second powder;
   heating the second powder at a temperature in a range of from 550 to 650° C. for a time in a range of from 15 minutes (min) to 1.5 h to obtain the nanocomposite, including graphitic carbon nitride (g-$C_3N_4$), molybdenum oxide ($MoO_3$), and magnesium aluminate ($MgAl_2O_4$) in a mass relationship to each other in a range of from 7 to 13: 3 to 6: 80 to 90.

2. The method of claim 1, wherein the average pore distribution of the nanocomposite is unimodal, and
   wherein a Brünauer-Emmett-Teller (BET) specific surface area of the nanocomposite is in a range of from 8 to 12 square meters per gram (m$^2$/g), and/or
   wherein an average pore diameter of the nanocomposite, according to Barrett-Joyner-Halenda (BJH) measurement method, is in a range of from 5 to 15 nanometer (nm), and/or
   wherein an average pore volume of the nanocomposite, according to the BJH measurement method, is in a range of from 0.01 to 0.5 cubic centimeter per gram (cm$^3$/g).

3. The method of claim 1, wherein the nanocomposite has a (311) spinel interplanar spacing in a range of from 0.205 to 0.285 nm, (411) $MoO_3$ interplanar spacing in a range of from 0.150 to 0.230 nm, (511) spinel interplanar spacing in a range of from 0.115 to 0.195 nm, (311) MgO interplanar spacing in a range of from 0.087 to 0.167 nm, (622) spinel interplanar spacing in a range of from 0.080 to 0.160 nm, according to selected area diffraction (SAED).

4. The method of claim 1, wherein the mass relationship of the nanocomposite is in a range of from 7 to 11:4 to 6:84 to 86,
   wherein the nanocomposite has a (311) spinel interplanar spacing of 0.245±2% nm, (411) $MoO_3$ interplanar spacing of 0.19±2% nm, (511) spinel interplanar spacing of 0.155±2% nm, (311) MgO interplanar spacing of 0.127±2% nm, (622) spinel interplanar spacing of 0.12±2% nm, according to SAED,
   wherein an XRD spectrum of the nanocomposite under Cu-filtered CuKα radiation (1.5418 Å) powered at 45 kV and 10 mA has 2θ peaks of
   an $MoO_3$ hexagonal phase at 18.7±1, 28.7±1, 33.0±1, 33.8±1, 36.8±1, and 42.8±1°,
   an $MgAl_2O_4$ spinel phase at 19·3±1, 36.8±1, 44.6±1, 59·3±1, and 65.01±1°,
   an MgO cubic phase at 42.8±1, 62.2±1, and 74.6±1°,
   g-$C_3N_4$-related diffractions at 27.8±1, 36.8±1, 44.6±1, and 59.3±1°, and
   wherein no more than 1% relative intensity $Al_2O_3$ is detected in the XRD spectrum.

5. The method of claim 1, wherein the magnesium salt in the combining includes Mg(NO$_3$)$_2$,
   wherein the aluminum salt in the combining includes aluminium nitrate (Al(NO$_3$)$_3$),
   wherein the molybdate salt in the combining includes (NH$_4$)$_2$MoO$_4$ (ammonium molybdate),
   wherein the heating of the first mixture obtains the first solid with at least 99.9 wt. % of the aqueous solvent removed,
   wherein the calcining is at a temperature in a range of from 675 to 725° C. for a time in a range of from 2.75 to 3.25 h, and
   wherein the heating of the second powder is at a temperature in a range of from 590 to 610° C. for a time in a range of from 55 min to 1.1 h.

6. The method of claim 1, wherein the nanocomposite obtained includes no molybdenum sulfide.

7. The method of claim 1, wherein the nanocomposite obtained includes no sulfide.

8. The method of claim 1, wherein the nanocomposite obtained includes less than 10 wt. % Co, relative to total nanocomposite weight.

9. The method of claim 1, wherein the nanocomposite obtained includes less than 1 wt. % Co, relative to total nanocomposite weight.

10. The method of claim 1, wherein the nanocomposite obtained includes no added Co.

11. The method of claim 1, wherein the first powder in the calcining includes no melamine.

12. The method of claim 1, wherein the average pore distribution of the nanocomposite is unimodal.

13. The method of claim 1, wherein a BET specific surface area of the nanocomposite is in a range of from 8 to 12 m$^2$/g.

14. The method of claim 1, wherein an average pore diameter of the nanocomposite, according to BJH measurement method, is in a range of from 5 to 15 nm.

15. The method of claim 1, wherein an average pore volume of the nanocomposite, according to the BJH measurement method, is in a range of from 0.01 to 0.5 $cm^3/g$.

16. The method of claim 1, wherein the $MoO_3$ in the nanocomposite has a hexagonal crystal structure.

17. The method of claim 1, wherein the heating of the first mixture removes the aqueous solvent such that the first solid is a solid that can be ground to a powder without further solvent removal.

18. The method of claim 1, wherein the carbon source includes menthol.

19. The method of claim 1, wherein the carbon source includes dextrose.

20. A nanocomposite, including:

graphitic $C_3N_4$;

$MoO_3$; and $MgAl_2O_4$, wherein the graphitic $C_3N_4$, $MoO_3$, and $MgAl_2O_4$ are present in the nanocomposite in a mass relationship to each other in a range of from 5 to 15: 2 to 7: 75 to 90.

* * * * *